United States Patent
Shiozaki et al.

(10) Patent No.: US 8,980,513 B2
(45) Date of Patent: Mar. 17, 2015

(54) POLYESTER RESIN, ELECTROSTATIC CHARGE IMAGE DEVELOPING TONER, ELECTROSTATIC CHARGE IMAGE DEVELOPER, TONER CARTRIDGE, PROCESS CARTRIDGE, IMAGE FORMING APPARATUS, AND IMAGE FORMING METHOD

(75) Inventors: Hirofumi Shiozaki, Kanagawa (JP); Susumu Yoshino, Kanagawa (JP); Hirotaka Matsuoka, Kanagawa (JP); Yuki Sasaki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 13/456,760

(22) Filed: Apr. 26, 2012

(65) Prior Publication Data

US 2013/0164672 A1    Jun. 27, 2013

(30) Foreign Application Priority Data

Dec. 22, 2011 (JP) ................................ 2011-282383

(51) Int. Cl.
*G03G 9/087* (2006.01)
*C08G 63/16* (2006.01)
*C08G 63/21* (2006.01)

(52) U.S. Cl.
CPC ............ *C08G 63/21* (2013.01); *G03G 9/08755* (2013.01); *G03G 2215/0132* (2013.01)
USPC ..................... 430/109.4; 430/123.5; 527/600; 527/604; 528/1

(58) Field of Classification Search
CPC ........................... G03G 9/08755; C08G 63/21
USPC ................... 430/109.4; 528/1; 527/600, 604; 399/252

See application file for complete search history.

(56) References Cited

U.S. PATENT DOCUMENTS

| 7,569,320 | B2 * | 8/2009 | Nakanishi et al. | 430/109.4 |
| 8,431,303 | B2 * | 4/2013 | Sacripante et al. | 430/109.4 |
| 8,580,472 | B2 * | 11/2013 | Farrugia et al. | 430/109.4 |
| 2006/0045571 | A1 * | 3/2006 | Matsuura et al. | 399/149 |
| 2011/0305982 | A1 * | 12/2011 | Matsumoto et al. | 430/108.1 |

FOREIGN PATENT DOCUMENTS

| JP | A-1-204062 | 8/1989 |
| JP | A-11-60703 | 3/1999 |
| JP | A-2008-256845 | 10/2008 |

OTHER PUBLICATIONS

Grant, R. et al., ed., Grant & Hackh's Chemical Dictionary, fifth edition, McGraw-Hill Book Company, NY (1987), pp. 476 and 638.*
Windholz, M., et al., ed., The Merck Index, 9th edition, Merck& Co., Inc, NJ (1977), No. 9812, p. 1309.*

* cited by examiner

*Primary Examiner* — Janis L Dote
(74) *Attorney, Agent, or Firm* — Oliff PLC

(57) ABSTRACT

A polyester resin is a polycondensate obtained by reacting a divalent alcohol, a divalent carboxylic acid, and a mono- or divalent rosin by the use of a zinc compound as a reaction catalyst.

11 Claims, 2 Drawing Sheets

POLYESTER RESIN, ELECTROSTATIC CHARGE IMAGE DEVELOPING TONER, ELECTROSTATIC CHARGE IMAGE DEVELOPER, TONER CARTRIDGE, PROCESS CARTRIDGE, IMAGE FORMING APPARATUS, AND IMAGE FORMING METHOD

CROSS-REFERENCE TO RELATED APPLICATIONS

This application is based on and claims priority under 35 USC 119 from Japanese Patent Application No. 2011-282383 filed Dec. 22, 2011.

BACKGROUND

Technical Field

The present invention relates to a polyester resin, an electrostatic charge image developing toner, an electrostatic charge image developer, a toner cartridge, a process cartridge, an image forming apparatus, and an image forming method.

SUMMARY

According to an aspect of the invention, there is provided a polyester resin that is a polycondensate obtained by reacting a divalent alcohol, a divalent carboxylic acid, and a mono- or divalent rosin by the use of a zinc compound as a reaction catalyst.

BRIEF DESCRIPTION OF THE DRAWINGS

Exemplary embodiments of the present invention will be described in detail based on the following figures, wherein.

DETAILED DESCRIPTION

Figure 1:
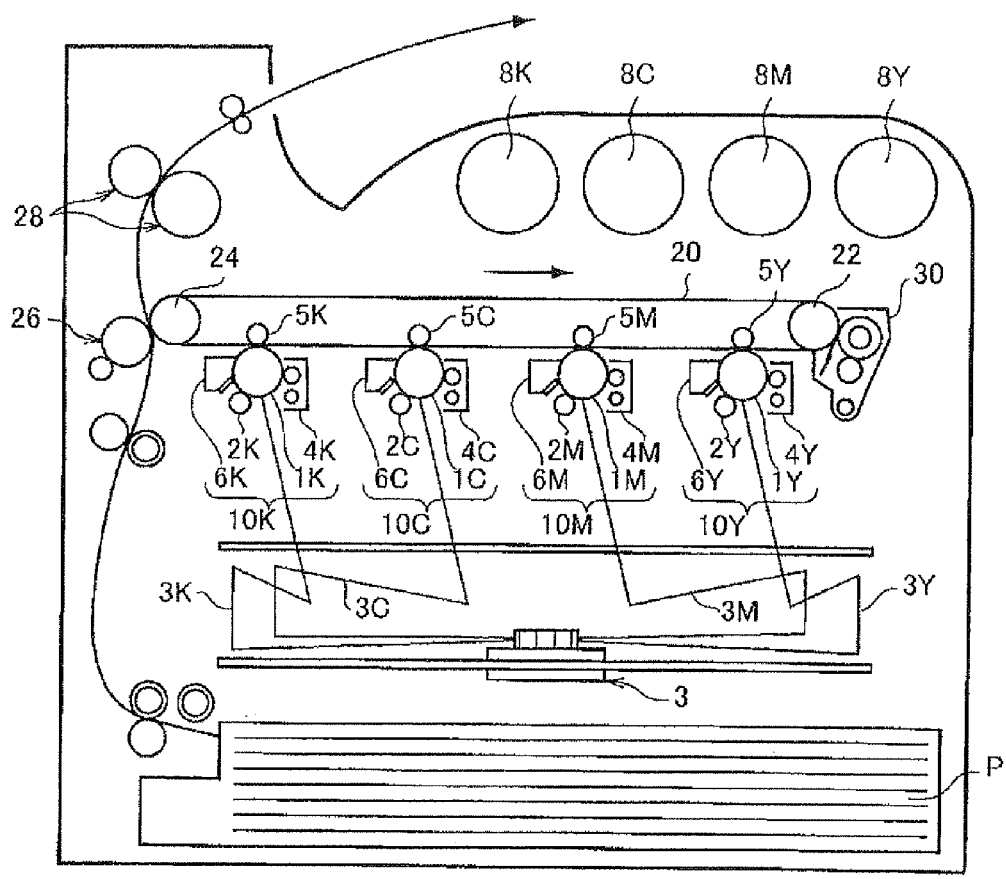
FIG. 1 is a diagram schematically showing the configuration of an example of an image forming apparatus according to an exemplary embodiment.

Hereinafter, exemplary embodiments of the invention will be described in detail.

Polyester Resin

A polyester resin according to this exemplary embodiment is a polycondensate obtained by reacting a divalent alcohol, a divalent carboxylic acid, and a mono- or divalent rosin, and a zinc compound is used as a reaction catalyst to promote the reaction.

The polyester resin according to this exemplary embodiment is a polyester resin with a rosin that is introduced to a main chain by polycondensing a mono- or divalent rosin and a divalent alcohol.

The above polycondensation reaction tends to be low in reactivity and tends to be difficult to advance.

It is thought that the reason for this is that since the rosin has a bulky structure, steric hindrance from the rosin Occurs.

Therefore, when the polyester resin with a rosin that is introduced to a main chain is synthesized, a reaction catalyst is used to promote the polycondensation reaction. However, when a tin-containing catalyst, a titanium-containing catalyst or the like is used as in the past, the synthesized polyester resin tends to be colored.

However, in the polyester resin according to this exemplary embodiment, the coloring tends to be suppressed in comparison to the case of performing the synthesis by the use of tin, titanium or the like as a reaction catalyst in the polycondensation reaction.

The reason for this is not clear. However, it is thought that the reason is that the polyester resin according to this exemplary embodiment is obtained by causing a polycondensation reaction with higher reactivity than in the case of using a tin-containing catalyst, a titanium-containing catalyst or the like by the use of a zinc compound as a reaction catalyst.

In other words, it is thought that by improving the reactivity of the polycondensation reaction, the polyester resin according to this exemplary embodiment is suppressed from being colored.

Here, the improvement in reactivity of the polycondensation reaction is expressed by an increase in the weight average molecular weight of the polyester resin or a reduction in the reaction time of the polycondensation reaction.

It is thought that when the polyester resin with a rosin that is introduced to a main chain is synthesized by the use of a tin-containing catalyst or a titanium-containing catalyst as a reaction catalyst in the polycondensation reaction, the reactivity of the polycondensation reaction is lower than in the case of using a zinc compound as a reaction catalyst, and thus the decomposition reaction of the synthesized polyester resin itself is started and results in the coloring of the polyester resin.

In addition, it is thought that when titanium-containing catalyst is used as a reaction catalyst, titanium is coordinated to the molecule of the polyester resin, and thus the polyester resin is colored.

From the above description, the polyester resin according to this exemplary embodiment is suppressed from being colored by the use of a zinc compound as a reaction catalyst for the polycondensation reaction.

Hereinafter, the polyester resin according to this exemplary embodiment will be described in detail.

The polyester resin according to this exemplary embodiment is a polycondensate obtained by reacting a divalent alcohol, a divalent carboxylic acid, and a mono- or divalent rosin by the use of a zinc compound as a reaction catalyst.

First, the reaction catalyst will be described.

As the reaction catalyst, a zinc compound is used.

Here, as the zinc compound, any zinc compound may be used as long as it contains zinc in one molecule, and examples thereof include zinc oxide and a material having a salt structure resulting from the reaction between an acid and zinc.

Examples of the compound having a salt structure resulting from the reaction between an acid and zinc include zinc acetate and zinc acetate dihydrate. Zinc acetate is more desirably used.

Here, in the polyester resin synthesized by reacting zinc compound as a catalyst, zinc remains.

Whether zinc remains or not in the polyester resin is measured, for example, as follows.

In the following description, a method of measuring whether zinc remains or not in a toner (toner particles) using a polyester resin having the zinc remaining therein will be described.

First, a solvent is prepared to dissolve a polyester resin as a binder resin. A toner is dissolved in the solvent and insoluble matter is removed. Then, the binder resin is extracted from the toner by a method such as removal of the solvent, and then the measurement is performed through elementary analysis employing X-ray fluorescence, ICP analysis or the like.

In addition, when the toner has an external additive, for example, a method is used in which the toner is dispersed in ion exchange water containing a dispersant added thereto and is irradiated with ultrasonic waves to separate the external additive from the toner particles, and only the toner particles are taken by filtering and washing.

When the measurement is performed without the external additive by the above method, only the zinc contained in the zinc compound that is used as a reaction catalyst in the polycondensation reaction of the polyester resin is measured even when the zinc is contained in the external additive.

The content of the zinc in the polyester resin contained in the toner is, for example, from 0.08% by weight to 1.5% by weight with respect to the toner.

Next, the mono- or divalent rosin will be described.

A monovalent rosin represents a rosin having one carboxylic group-containing structure (hereinafter, sometimes simply referred to as rosin).

In addition, a divalent rosin represents a rosin having two carboxylic group-containing structures from amongst monovalent rosins modified and having plural carboxylic group-containing structures (hereinafter, sometimes simply referred to as "modified rosin").

First, the rosin will be described.

A rosin is a generic term for a resin acid obtained from a tree, and is a substance derived from a natural product including an abietic acid and its isomers, of which the major component is a type of tricyclic diterpene. Specific examples of the components of the rosin include, in addition to an abietic acid, a palustric acid, a neoabietic acid, a pimaric acid, a dehydroabietic acid, an isopimaric acid, and a sandaracopimaric acid.

The rosin that is used in this exemplary embodiment is a mixture thereof.

In the classification according to collection method, rosins are classified broadly into tall rosins of which the raw material is pulp, gum rosins of which the raw material is crude turpentine, and wood rosins of which the raw material is pine stumps.

As the rosin, at least one of a gum rosin and a tall rosin is desirably used in view of easy availability.

In addition, the rosin may be a refined rosin. The refined rosin is obtained by removing, from unrefined rosins, high-molecular weight material that is thought to arise from peroxides of the resin acid and an unsaponified material contained in the unrefined rosins.

The refining method is not particularly limited, and known various refining methods are selected. Specific examples thereof include methods such as distillation, recrystallization, and extraction. Industrially, the refining through distillation is desirably performed. In general, distillation is selected in consideration of a distillation time with a temperature of from 200° C. to 300° C. and a pressure of 6.67 kPa or less. Recrystallization, is performed, for example, through dissolving an unrefined rosin in a good solvent, removing the solvent to prepare a concentrated solution, and adding a poor solvent to the solution. Examples of the good solvent include aromatic hydrocarbons such as benzene, toluene and xylene, chlorinated hydrocarbons such as chloroform, alcohols such as a lower alcohol, ketones such as acetone, and acetate esters such as ethyl acetate. Examples of the poor solvent include hydrocarbon-based solvents such as n-hexane, n-heptane, cyclohexane and isooctane. Extraction is a method of obtaining a refined rosin including, for example, preparing an alkaline aqueous solution by using alkaline water with an unrefined rosin, extracting an insoluble unsaponified material contained in the solution using an organic solvent, and neutralizing the water layer.

The rosin may be a disproportionated rosin. The disproportionated rosin is a rosin in which the unstable conjugated double bond in a molecule is eliminated by heating a rosin containing an abietic acid as a major component at high temperature in the presence of a disproportionation catalyst, and is a mixture containing a dehydroabietic acid and a dihydroabietic acid as major components.

Examples of the disproportionation catalyst include various known catalysts such as palladium carbon-, rhodium carbon-, and platinum carbon-supported catalysts, metallic powders such as nickel and platinum, and iodized products such as iodine and iodized iron.

The rosin may be a hydrogenated rosin to eliminate the unstable conjugated double bond in a molecule. For the hydrogenation reaction, known hydrogenation reaction conditions are selected. That is, the reaction is carried out by heating a rosin under hydrogen pressure in the presence of a hydrogenation catalyst. Examples of the hydrogenation catalyst include various known catalysts such as palladium carbon-, rhodium carbon-, and platinum carbon-supported catalysts, metallic powders such as nickel and platinum, and iodized products such as iodine and iron iodide.

In the cases of the disproportionated rosin and the hydrogenated rosin, the above-mentioned refining process may be provided before or after the disproportionation process or the hydrogenation process.

Next, the divalent rosin will be described.

The divalent rosin is obtained by reacting rosins with $\alpha,\beta$-unsaturated carboxylic acids (for example, an $\alpha,\beta$-unsaturated carboxylic acid or its acid anhydride). Specific examples of the divalent rosin include a rosin modified with a carboxylic acid (for example, a (meth)acrylic acid, a fumaric acid, a maleic acid, maleic acid anhydride, an itaconic acid, or a citraconic acid (anhydride)).

Representative examples of the divalent rosin modified with a carboxylic acid include a (meth)acrylic acid-modified rosin, a fumaric acid-modified rosin, and a maleic acid-modified rosin.

The above-mentioned monovalent rosin may be used as a rosin before modification.

The (meth)acrylic acid-modified rosin is a rosin modified with a (meth)acrylic acid.

Specific examples of the (meth)acrylic acid-modified rosin include a rosin obtained through an addition reaction of a rosin before modification with a (meth)acrylic acid. More specific examples thereof include a rosin obtained through a Diels-Alder reaction under heating that is caused with an acid having a conjugated double bond in the major component of a rosin before modification and a (meth)acrylic acid.

As the (meth)acrylic acid-modified rosin, an acrylic acid-modified rosin that is modified with an acrylic acid with less steric hindrance is preferably used from the viewpoint of the reaction activity in the Diels-Alder reaction.

"(Meth)acrylic" means acrylic or methacrylic. Namely, "(meth)acrylic acid" is an acrylic acid or methacrylic acid. "(Meth)acrylic acid-modified rosin" is a rosin modified with an acrylic acid or a rosin modified with a methacrylic acid.

In the (meth)acrylic acid-modified rosin, the degree of modification (hereinafter, (meth)acrylic acid modification degree) of the rosin with a (meth)acrylic acid may be, for example, from 5 to 105, desirably from 20 to 105, more desirably from 40 to 105, and even more desirably from 60 to 105 from the viewpoint of increasing the molecular weight of the polyester and reducing the low-molecular-weight oligomer component.

A (meth)acrylic acid modification degree $Xa$ is calculated by Formula (Aa). The greater the value of Formula (Aa), the higher the modification degree.

$$Xa=[(Xa1-Y)/(Xa2-Y)] \times 100 \quad \text{Formula (Aa)}$$

In Formula (Aa), $Xa1$ represents an SP value of a (meth)acrylic acid-modified rosin used to calculate the modification degree. $Xa2$ represents a saturated SP value of a (meth)acrylic acid-modified rosin obtained by reacting 1 mol of an acrylic acid with 1 mol of a rosin. $Y$ represents an SP value of the rosin.

Here, the SP value is a softening point that is measured by a ring-and-ball type automatic softening point tester. Specifically, the SP value is a value that is obtained by subjecting a target sample, that has been poured into a ring in a melted state and then cooled to room temperature (for example, 25° C.), to the measurement based on JIS B7410 under the following conditions.

Measurement Instrument: ASP-MGK2 ring-and-ball type automatic softening point tester (manufactured by Meitech Company Ltd.)
    Rate of Temperature Increase: 5° C./min
    Temperature at which Temperature Increase is Started: 40° C.
    Measurement Solvent: Glycerin In addition, the saturated SP value is an SP value when the reaction between the (meth)acrylic acid and the rosin is carried out until the SP value of the obtained (meth)acrylic acid-modified rosin reaches a saturated value.

A method of manufacturing a (meth)acrylic acid-modified rosin is not particularly limited. For example, a (meth)acrylic acid-modified rosin is obtained by the steps of mixing a rosin before modification and a (meth)acrylic acid and heating the mixture to a temperature of from 180° C. to 260° C. (desirably from 180° C. to 210° C.) to carry out a Diels-Alder reaction, thereby adding the (meth)acrylic acid to the acid having a conjugated double bond contained in the rosin.

After the reaction, the (meth)acrylic acid-modified rosin may be used as it is, or may be used after further refining through a procedure such as distillation.

The fumaric acid-modified rosin is a rosin modified with a fumaric acid.

Specific examples of the fumaric acid-modified rosin include a rosin obtained through an addition reaction of a rosin before modification with a fumaric acid. More specific examples thereof include a rosin obtained through a Diels-Alder reaction under heating that is caused with an acid having a conjugated double bond in the major component of a rosin before modification and a fumaric acid.

In the fumaric acid-modified rosin, the degree of modification (hereinafter, fumaric acid modification degree) of the rosin with a fumaric acid may be from 5 to 105, desirably from 20 to 105, more desirably from 40 to 105, and even more desirably from 60 to 105 from the viewpoint of increasing the molecular weight of the polyester and increasing the glass transition temperature.

A fumaric acid modification degree $Xf$ is calculated by the following Formula (Af). The greater the value of Formula (Af), the higher the modification degree.

$$Xf=[(Xf1-Y)/(Xf2-Y)] \times 100 \quad \text{Formula (Af)}$$

In Formula (Af) $Xf1$ represents an SP value of a fumaric acid-modified rosin used to calculate the modification degree. $Xf2$ represents an SP value of a fumaric acid-modified rosin obtained by reacting 1 mol of a fumaric acid with 0.7 mol of a rosin. $Y$ represents an SP value of the rosin.

Here, the SP value is a softening point that is measured by a ring-and-ball type automatic softening point tester. Specifically, the SP value is a value that is measured by the above-mentioned method.

A method of manufacturing a fumaric acid-modified rosin is not particularly limited. For example, a fumaric acid-modified rosin is obtained by the steps of mixing a rosin and a fumaric acid and heating the mixture to a temperature of from 180° C. to 260° C. (desirably from 180° C. to 210° C.) to carry out a Diels-Alder reaction, thereby adding the fumaric acid to the acid having a conjugated double bond contained in the rosin.

After the reaction, the fumaric acid-modified rosin may be used as it is, or may be used after further refining through a procedure such as distillation.

In the method of manufacturing a fumaric acid-modified rosin, a rosin and a fumaric acid are preferably reacted in the presence of phenols. The efficiency of reaction between the rosin and the fumaric acid is easily improved.

Preferable examples of the phenols include divalent phenol and a phenolic compound having at least a substituent group at an ortho position to a hydroxyl group (hereinafter, hindered phenol), and a hindered phenol is desirably used.

The divalent phenol is a compound in which two OH groups are bonded to a benzene ring, but in which other substituent groups are not bonded thereto. Specific preferable examples thereof include hydroquinone.

Specific preferable examples of the hindered phenol include t-butylcatechol.

The amount of the phenols used may be from 0.001 part by weight to 0.5 part by weight, desirably from 0.003 part by weight to 0.1 part by weight, and more desirably from 0.005 part by weight to 0.1 part by weight with respect to 100 parts by weight of the raw material monomer of the fumaric acid-modified rosin.

The maleic acid-modified rosin is a rosin modified with a maleic acid or maleic acid anhydride.

Specific examples of the maleic acid-modified rosin include a rosin obtained through an addition reaction of a rosin before modification with a maleic acid or maleic acid anhydride. More specific examples thereof include a rosin obtained through a Diels-Alder reaction under heating that is caused with an acid having a conjugated double bond in the major component of a rosin before modification and a maleic acid or maleic acid anhydride.

In the maleic acid-modified rosin, the degree of modification (hereinafter, maleic acid modification degree) of the rosin with a maleic acid or maleic acid anhydride may be from 30 to 105, desirably from 40 to 105, more desirably from 50 to 105, even more desirably from GO to 105, and particularly desirably from 70 to 105 from the viewpoint of increasing the molecular weight of the polyester and reducing the low-molecular-weight oligomer component.

A maleic acid modification degree $Xm$ is calculated by the following Formula (Am). The greater the value of Formula (Am), the higher the modification degree.

$$Xm=[(Xm1-Y)/(Xm2-Y)] \times 100 \quad \text{Formula (Am)}$$

In Formula (Am), $Xm1$ represents an SP value of a maleic acid-modified rosin used to calculate the modification degree. $Xm2$ represents a saturated SP value of a maleic acid-modified rosin obtained by reacting 1 mol of a maleic acid with 1 mol of a rosin at 230° C. $Y$ represents an SP value of the rosin.

Here, the SP value is a softening point that is measured by a ring-and-ball type automatic softening point tester. Specifically, the SP value is a value that is measured by the above-mentioned method.

In addition, the saturated SP value is an SP value when the reaction between the maleic acid and the rosin is carried out until the SP value of the obtained maleic acid-modified rosin reaches a saturated value.

A method of manufacturing a maleic acid-modified rosin is not particularly limited. For example, a maleic acid-modified rosin is obtained by the steps of mixing a rosin before modification and a maleic acid or maleic acid anhydride and heating the mixture to a temperature of from 80° C. to 260° C. (desirably from 180° C. to 210° C.) to carry out a Diels-Alder reaction, thereby adding the maleic acid or maleic acid anhydride to the acid having a conjugated double bond contained in the rosin.

After the reaction, the maleic acid-modified rosin may be used as it is, or may be used after further refining through a procedure such as distillation.

In the manufacturing methods for an itaconic acid-modified rosin and a citraconic acid-modified rosin, synthesis may be performed in the same manner as above, and the modification degrees thereof may also be calculated in the same manner as above.

The divalent alcohol will be described.

As the divalent alcohol, for example, at least one type selected from aliphatic dials and aromatic diols is used.

Specific examples of the aliphatic diols include, but are not limited to, ethylene glycol, 1,2-propanediol, 1,3-propanediol, 1,2-butanediol, 1,3-butanediol, 1-4-butanediol, 2,3-butanediol, 1-4-butenediol, 2-methyl-1,3-propanediol, 1,5-pentanediol, neopentyl glycol, 2-ethyl-2-methylpropane-1,3-diol, 2-butyl-2-ethylpropane-1,3-diol, 1,6-hexanediol, 3-methyl-1,5-pentanediol, 2-ethyl-1,3-hexanediol, 2,4-dimethyl-1,5-pentanediol, 2,2,4-trimethyl-1,3-pentanediol, 1,7-heptanediol, 1,9-nonanediol, 1,10-decanediol, 1,8-octanediol, 1,11-undecanediol, 1,12-dodecanediol, 1,13-tridecanediol, 1,14-tetradecanediol, 1,18-octadecanediol, 1,14-eicosanedecanediol, dimer diol, 3-hydroxy-2,2-dimethylpropyl-3-hydroxy-2,2-dimethylpropanoate, diethylene glycol, triethylene glycol, polyethylene glycol, dipropylene glycol, and polypropylene glycol.

In addition, examples of the aromatic diols include, but are not limited to, a bisphenol A-ethylene oxide adduct, a bisphenol A-propylene oxide adduct, and a bisphenol A-butylene oxide adduct.

These divalent alcohols may be used singly or in combination of two or more thereof.

The divalent carboxylic acid will be described.

As the divalent carboxylic acid, at least one type selected from the group consisting of aromatic dicarboxylic acids and aliphatic dicarboxylic acids is used. Examples thereof include aromatic dicarboxylic acids such as a phthalic acid, an isophthalic acid, a terephthalic acid, a 1,4-naphthalenedicarboxylic acid, and a 2,6-naphthalenedicarboxylic acid; aliphatic dicarboxylic acids such as an oxalic acid, a malonic acid, a maleic acid, a fumaric acid, a citraconic acid, an itaconic acid, a glutaconic acid, a succinic acid, an adipic acid, a sebacic acid, an azelaic acid, a dimer acid, an alkylsuccinic acid having an alkyl group with a carbon number of from 1 to 20 having a branched chain, and an alkenylsuccinic acid having an alkenyl group with a carbon number of from 1 to 20 having a branched chain; anhydrides of the acids; and alkyl esters (with a carbon number of from 1 to 3) of the acids.

Among them, aromatic carboxylic acid compounds are desirably used from the viewpoint of the durability and fixability of the toner and the dispersibility of the colorant.

In addition, as a carboxylic acid component other than the divalent rosin and the divalent carboxylic acid, a tri- or higher-valent carboxylic acid may be contained.

Examples of the tri- or higher-valent carboxylic acid include a trimellitic acid, a pyromellitic acid, and a citric acid.

A method of manufacturing the polyester resin will be described.

The polyester resin according to this exemplary embodiment is prepared by a manufacturing method using a zinc compound as a reaction catalyst with a divalent carboxylic acid, a divalent alcohol, and a mono- or divalent rosin as raw materials. As the reaction method, for example, any of an ester exchange reaction and a direct esterification reaction may be applied. In addition, polycondensation may be promoted by a method of increasing a reaction temperature by pressuring, decompression or a method of allowing inert gas to flow at normal pressure.

The amount of the zinc compound as a reaction catalyst added may be, for example, from 0.01 part by weight to 1.5 parts by weight, and more desirably from 0.05 part by weight to 1.0 part by weight with respect to 100 parts by weight of a total of the mono- or divalent rosin, divalent carboxylic acid, and divalent alcohol component.

The reaction temperature may be preferably, for example, a temperature of from 180° C. to 300° C.

The monovalent rosin may be preferably contained in an amount of from 5% by weight to 20% by weight (desirably from 5% by weight to 13% by weight) with respect to the entire carboxylic acid components.

In addition, the divalent rosin modified with a carboxylic acid may be preferably contained in an amount of from 5% by weight to 70% by weight (desirably from 10% by weight to 60% by weight) with respect to the entire carboxylic acid components.

When the polyester resin according to this exemplary embodiment is hydrolyzed, it is decomposed into monomers (carboxylic acid component and alcohol component). Since the polyester resin is, for example, a condensate of the carboxylic acid and the alcohol (for example, diol) (1:1), the configuration of the resin is estimated from the decomposed products.

Characteristics of the polyester resin will be described.

The weight-average molecular weight of the polyester resin according to this exemplary embodiment is desirably from 4,000 to 1,000,000, and more desirably from 7,000 to 300,000 from the viewpoint of the durability and offset resistance of the toner.

Here, in the polyester resin according to this exemplary embodiment, since the reactivity of the polycondensation reaction in the synthesis of the polyester resin is improved as mentioned above, a weight-average molecular weight (Mw) tends to be a high value of from 15,000 to 30,000 (or from about 15,000 to about 30,000), and more specifically, a high value of from 20,000 to 25,000.

Therefore, an electrostatic charge image developing toner according to this exemplary embodiment containing the polyester resin according to this exemplary embodiment tends to be improved in low-temperature fixability and an electrostatic property in the electrostatic charge image developing toner.

It is thought that the reason for this is that due to a high weight-average molecular weight, it is possible to improve the low-temperature fixability (folding evaluation) that is obtained due to an improvement in fragility of the resin and to improve a reduction in an electrostatic property due to the low-molecular-weight component.

In the measurement of weight average molecular weight Mw and number average molecular weight Mn, two "HLC-8120GPC, SC-8020 (manufactured by Tosoh Corporation, 6.0 mm ID×15 cm)" are used, and as an eluent, tetrahydrofuran (THF) is used. As the test conditions, the sample concentration is 0.5%, the flow rate is 0.6 ml/min, the sample injection amount is 10 the measurement temperature is 40° C., and the test is performed using a refractive index (RI) detector (differential refractive index detector). In addition, the calibration curve is prepared with ten samples of "polystyrene standard sample TSK standards": "A-500", "F-1", "F-10", "F-80", "F-380", "A-2500", "F-4", "F-40", "F-128", "F-700", manufactured by Tosoh Corporation.

The softening temperature of the polyester resin according to this exemplary embodiment is desirably from 80° C. to 160° C., and more desirably from 90° C. to 150° C. from the viewpoint of the fixability, preservative property, and durability of the toner.

In the measurement of the softening temperature, a koka-type flow tester CFT-500 (manufactured by Shimadzu Corporation) is used to obtain the softening temperature as a temperature corresponding to ½ of the height from the flow start point to the end point when a 1-cm$^3$ sample is melted and allowed to flow under conditions of a die pore diameter of 0.5 mm, a pressurization load of 0.98 MPa (10 Kg/cm$^2$), and a rate of temperature increase of 1° C./min.

The glass transition temperature of the polyester resin according to this exemplary embodiment is desirably from 35° C. to 80° C., and more desirably from 40° C. to 70° C. from the viewpoint of the fixability, preservative property, and durability.

The softening temperature and the glass transition temperature are easily adjusted by adjusting the composition of the raw material monomers, the polymerization initiator, the molecular weight, and the catalyst amount, or by selecting the reaction conditions.

In the measurement of the glass transition temperature, "DSC-20" (manufactured by Seiko Electronics Industrial Co., Ltd) is used to subject 10 mg of a sample to the measurement by heating at a rate of temperature increase of 10° C./min.

The acid value of the polyester resin according to this exemplary embodiment is desirably from 1 mg KOH/g to 50 mg KOH/g, and more desirably from 3 mg KOH/g to 30 mg KOH/g from the viewpoint of the electrostatic property of the electrostatic charge image developing toner.

The acid value is measured using a neutralization titration method according to JIS K0070. That is, an appropriate amount of a sample is separated, 100 ml of a solvent (diethyl ether/ethanol mixture) and several drops of an indicator (phenolphthalein solution) are added thereto, and the resultant mixture is shaken until the sample dissolves on a water bath. The resultant material is titrated with a 0.1 mol/l ethanolic potassium hydroxide solution, and a time at which the red color of the indicator is continuously shown for 30 seconds is set as an end point. When the acid value is denoted by A, the sample amount is denoted by S (g), the 0.1 mol/l ethanolic potassium hydroxide solution used in the titration is denoted by B (ml), and a factor of the 0.1 mol/l ethanolic potassium hydroxide solution is denoted by f, the acid value is calculated by the formula $A=(B \times f \times 5.611)/S$.

The polyester resin according to this exemplary embodiment may be a modified polyester resin. As the modified polyester resin, for example, a polyester grafted or blocked with phenol, urethane, epoxy or the like using the method described in JP-A-11133668, JP-A-10-239903, JP-A-8-20636 or the like is included.

When the polyester resin of this exemplary embodiment is used as a binder resin for an electrostatic charge image developing toner, it is possible to obtain an electrostatic charge image developing toner having improved low-temperature fixability and an improved electrostatic property.

In the electrostatic charge image developing toner of this exemplary embodiment, known binder resins, for example, a vinyl-based resin such as a styrene-acrylic resin, an epoxy resin, and other resins such as polycarbonate and polyurethane may be used in combination in the scope of not damaging the effect of this exemplary embodiment, and the content of the polyester resin of the invention in the binder resin is desirably 70% by weight or greater, more desirably 90% by weight or greater, and even more desirably, substantially 100% by weight.

Electrostatic Charge Image Developing Toner

An electrostatic charge image developing toner (hereinafter, sometimes referred to as "toner") according to this exemplary embodiment contains the above-mentioned polyester resin according to this exemplary embodiment.

Hereinafter, the toner according to this exemplary embodiment will be described in detail.

The toner according to this exemplary embodiment has, for example, toner particles, and if necessary, an external additive.

The toner particles will be described.

The toner particles contain a binder resin, and if necessary, a colorant, a release agent, and other additives.

Examples of the binder resin include an amorphous resin, and the above-mentioned polyester resin according to this exemplary embodiment is applied as an amorphous resin.

As the binder resin, a crystalline resin may be used in combination with the amorphous resin.

As the binder resin, other amorphous resins other than the polyester resin according to this exemplary embodiment may be used in combination with the above-mentioned polyester according to this exemplary embodiment.

The content of the polyester resin according to this exemplary embodiment is desirably 70 parts by weight or greater, and more desirably 90 parts by weight or greater with respect to 100 parts by weight of the entire binder resins.

Here, the amorphous resin is a resin that does not have a clear heat absorption peak, but has only a stepwise change in heat absorption in the heat analysis measurement using differential scanning calorimetry (DSC). It is present as a solid at room temperature (for example, 25° C.), and is thermally plasticized at a temperature equal to or higher than the glass transition temperature.

The crystalline resin is a resin that does not have a stepwise change in heat absorption amount, but has a clear heat absorption peak in differential scanning calorimetry (DSC).

Specifically, for example, the crystalline resin means that the half-value width of the heat absorption peak in the measurement at a rate of temperature increase of 10° C./min is within 10° C., and the amorphous resin means a resin with a half-value width exceeding 10° C. or a resin that is not recognized to have a clear heat absorption peak.

Examples of the crystalline resin include a crystalline polyester resin, a polyalkylene resin, and a long-chain alkyl (meth)acrylate resin, and a crystalline polyester resin is desirably used from the viewpoint that an immediate change in viscosity due to heating appears more frequently and the viewpoint of a balance between mechanical strength and low-temperature fixability.

The crystalline polyester resin may be a condensation polymer of an aliphatic dicarboxylic acid (including its acid anhydride and acid chloride) and an aliphatic diol from the viewpoint of, for example, realizing the low-temperature fixability.

The content of the crystalline resin is desirably from 1 part by weight to 20 parts by weight, and more desirably from 5 parts by weight to 15 parts by weight with respect to 100 parts by weight of the entire binder resins.

In this exemplary embodiment, the low-temperature fixing is fixing of a toner by heating at a temperature of about 120° C. or lower.

Furthermore, examples of the amorphous resin include known binder resins, for example, a vinyl-based resin such as a styrene-acrylic resin, an epoxy resin, and other resins such as polycarbonate and polyurethane.

The colorant may be, for example, a dye or a pigment, and a pigment is desirably used from the viewpoint of the light resistance and water resistance.

Examples of the colorant include known pigments such as Carbon Black, Aniline Black, Aniline Blue, Calcoil Blue, Chrome Yellow, Ultramarine Blue, Du Pont Oil Red, Quinoline Yellow, Methylene Blue Chloride, Phthalocyanine Blue, Malachite Green Oxalate, Lamp Black, Rose Bengal, Quinacridone, Benzidine Yellow, C.I. Pigment Red 48:1, C.I. Pigment Red 57:1, C.I. Pigment Red 122, C.I. Pigment Red 185, C.I. Pigment Red 238, C.I. Pigment Yellow 12, C.I. Pigment Yellow 17, C.I. Pigment Yellow 180, C.I. Pigment Yellow 97, C.I. Pigment Yellow 74, C.I. Pigment Blue 15:1 and C.I. Pigment Blue 15:3.

As the colorant, if necessary, a surface-treated colorant may be used, or a pigment dispersant may be used.

By selecting the colorant type, a yellow toner, a magenta yellow, a cyan toner, a black toner and the like are obtained.

The content of the colorant is desirably in the range of from 1 part by weight to 30 parts by weight with respect to 100 parts by weight of the binder resin.

Examples of the release agent include paraffin wax such as low-molecular-weight polypropylene and low-molecular-weight polyethylene; silicone resins; rosins; rice wax; and carnauba wax. The melting temperature of the release agents is desirably from 50° C. to 100° C., and more desirably from 60° C. to 95° C.

The content of the release agent is desirably from 0.5 part by weight to 15 parts by weight, and more desirably from 1.0 part by weight to 12 parts by weight with respect to 100 parts by weight of the binder resin.

When the content of the release agent is 0.5% by weight or greater, particularly, the occurrence of a peeling error is prevented in, oil-less fixing. When the content of the release agent is 15% by weight or less, there is no deterioration in fluidity of the toner, and the image quality and the reliability of image formation are improved.

Examples of other additives include a charge-controlling agent, and as the charge-controlling agent, known agents may be used. However, an azo-based metal complex compound, a metal complex compound of a salicylic acid, and a resin-type charge-controlling agent containing a polar group may be used.

The toner particles may be toner particles having a single-layer structure, or may be toner particles having a so-called core-shell structure configured to have a core portion (core particle) and a coating layer (shell layer) coating the core portion.

The toner particles having a core-shell structure may be configured to have, for example, a core portion that contains a binder resin (the polyester according to this exemplary embodiment and the crystalline polyester resin), and if necessary, other additives such as a colorant and a release agent, and a coating layer that contains a binder resin (the polyester according to this exemplary embodiment).

The volume average particle diameter of the toner particles may be, for example, from 2.0 μm to 10 μm, and desirably from 3.5 μm to 7.0 μm.

As a method of measuring the volume average particle diameter of the toner particles, a measurement sample is added in an amount of from 0.5 mg to 50 mg into 2 ml of a surfactant as a dispersant, desirably a 5% by weight aqueous solution of sodium alkylbenzene sulfonate, and the resultant material is added into from 100 ml to 150 ml of the electrolyte. An ultrasonic disperser subjects the electrolyte in which the measurement sample is suspended to a dispersion treatment for 1 minute, and a COULTER MULTISIZER II (manufactured by Beckman Coulter Inc.) measures a particle size distribution of the particles having a particle diameter in the range of from 2.0 μm to 60 μm by the use of an aperture with an aperture diameter of 100 μm. The number of particles to be subjected to the measurement is 50,000.

In the particle size ranges (channels) into which the obtained particle size distribution is divided, a volume cumulative distribution is drawn from the smallest-diameter side, and a particle diameter corresponding to 50% in the cumulative distribution is set to a volume average particle diameter D50v.

A shape factor SF1 of the toner particles may be, for example, from 110 to 150, and desirably from 120 to 140.

Here, the shape factor SF1 is obtained by the following Formula (1).

$$SF1=(ML^2/A)\times(\pi/4)\times100 \qquad \text{Formula (1)}$$

In the Formula (1), ML represents the absolute maximum length of the toner particles, and A represents a projected area of the toner particles.

Mainly, SF1 is calculated, for example, as follows using a microscopic image or a scanning electron microscope (SEM) image analyzed by the use of an image analyzer and converted numerically. That is, an optical microscopic image of particles sprayed on the surface of a glass slide is scanned to an image analyzer LUZEX through a video camera, the maximum lengths and the projected areas of 100 particles are obtained for calculation using the above-mentioned Formula (1), and an average value thereof is obtained.

Examples of the external additive include inorganic particles, and examples of the inorganic particles include $SiO_2$, $TiO_2$, $Al_2O_3$, $CuO$, $ZnO$, $SnO_2$, $CeO_2$, $Fe_2O_3$, $MgO$, $BaO$, $CaO$, $K_2O$, $Na_2O$, $ZrO_2$, $CaO.SiO_2$, $K_2O.(TiO_2)_n$, $Al_2O_3.2SiO_2$, $CaCO_3$, $MgO_3$, $BaSO_4$, and $MgSO_4$.

The surfaces of the inorganic particles as an external additive may be subjected to a hydrophobizing treatment in advance. The hydrophobizing treatment is performed through, for example, dipping of the inorganic particles in a hydrophobizing treatment agent. The hydrophobizing treatment agent is not particularly limited, and examples thereof include a silane-based coupling agent, silicone oil, a titanate-based coupling agent, and an aluminum-based coupling agent. These may be used singly or in combination of two or more types.

The amount of the hydrophobizing treatment agent is generally, for example, from 1 part by weight to 10 parts by weight with respect to 100 parts by weight of the inorganic particles.

Examples of the external additive include resin particles (resin particles of polystyrene, a polymethylmethacrylate resin (PMMA), a melamine resin and the like), and a cleaning activator (for example, fine powders of metal salts of higher fatty acids represented by zinc stearate and fluorine-based high-molecular-weight materials).

The amount of the external additive externally added may be, for example, from 0.01 part by weight to 5 parts by weight, desirably from 0.01 part by weight to 2.0 parts by weight with respect to 100 parts by weight of the toner particles.

Hereinafter, a method of manufacturing the toner according to this exemplary embodiment will be described.

For example, toner particles are obtained, and then if necessary, an external additive is mixed therewith to obtain a toner.

As a toner particle manufacturing method, any of a dry method (for example, a kneading pulverization method and the like) and a wet method (for example, an aggregation coalescence method, a suspension polymerization method, a dissolution suspension granulation method, a dissolution suspension method, a dissolution emulsion aggregation coalescence method and the like) may be used for manufacturing. Among them, for example, using a kneading pulverization method in which a binder resin, and if necessary, a colorant, a release agent, and other internal additives are added, kneaded, pulverized, and classified; and a method in which the particles obtained by the kneading pulverization method are changed in shape by a mechanical impact force or heat energy, toner particles may be preferably obtained.

When the toner contains an external additive, the toner is manufactured by mixing toner particles with the external additive by the use of a HENSCHEL mixer, a V-blender or the like.

Electrostatic Charge Image Developer

An electrostatic charge image developer according to this exemplary embodiment contains at least the toner according to this exemplary embodiment.

The electrostatic charge image developer according to this exemplary embodiment may be a single-component developer containing only the toner according to this exemplary embodiment, or a two-component developer in which the toner and a carrier are mixed.

The carrier is not particularly limited and known carriers are used. Examples of the carrier include a resin-coated carrier, a magnetism dispersion-type carrier and a resin dispersion-type carrier.

The mixing ratio (weight ratio) between the toner according to this exemplary embodiment and the carrier in the two-component developer is desirably in the range of from about 1:100 to about 30:100 (toner:carrier), and more desirably from about 3:100 to about 20:100.

Image Forming Apparatus and Image Forming Method

Next, an image forming apparatus and an image forming method according to this exemplary embodiment will be described.

The image forming apparatus according to this exemplary embodiment has: an image holding member; a charging section that charges the image holding member; an electrostatic charge image forming section that forms an electrostatic charge image on the surface of the charged image holding member; a developing section that contains an electrostatic charge image developer and develops the electrostatic charge image formed on the image holding member as a toner image with the electrostatic charge image developer; a transfer section that transfers the toner image formed on the image holding member onto a transfer medium; and a fixing section that fixes the toner image transferred onto the transfer medium. As the electrostatic charge image developer, the electrostatic charge image developer according to this exemplary embodiment is applied.

In the image forming apparatus according to this exemplary embodiment, for example, a portion including the developing section may have a cartridge structure (process cartridge) that is detachably mounted on the image forming apparatus. As the process cartridge, a process cartridge that contains the electrostatic charge image developer according to this exemplary embodiment and is provided with a developing section is preferably used.

The image forming method according to this exemplary embodiment has a charging process of charging the surface of an image holding member; an electrostatic charge image forming process of forming an electrostatic charge image on the surface of the image holding member; a developing process of developing the electrostatic charge image formed on the image holding member as a toner image with an electrostatic charge image developer; a transfer process of transferring the toner image formed on the image holding member onto a transfer medium; and a fixing process of fixing the toner image transferred onto the transfer medium. As the electrostatic charge image developer, the electrostatic charge image developer according to this exemplary embodiment is applied.

Hereinafter, an example of the image forming apparatus according to this exemplary embodiment will be shown. However, the image forming apparatus is not limited thereto. Major portions shown in the drawing will be described and descriptions of other portions will be omitted.

FIG. 1 is a diagram schematically showing the configuration of a 4-drum tandem color image forming apparatus. The image forming apparatus shown in FIG. 1 includes first to fourth image forming units 10Y, 10M, 10C, and 10K (image forming sections) of an electrophotographic type that output color images of yellow (Y), magenta (M), cyan (C), and black (K), respectively, based on color-separated image data. The image forming units (hereinafter, sometimes simply referred to as "units") 10Y, 10M, 10C, and 10K are arranged with a predetermined distance therebetween in the horizontal direction. The units 10Y, 10M, 10C, and 10K may be process cartridges that are detachably mounted on the image forming apparatus body.

An intermediate transfer belt 20 as an intermediate transfer medium is disposed above the units 10Y, 10M, 10C, and 10K in the drawing to extend via the units. The intermediate transfer belt 20 is wound on a driving roller 22 and a support roller 24 coming into contact with the inner surface of the intermediate transfer belt 20, which are separated from each other on the left and right sides in the drawing, and travels in the direction toward the fourth unit 10K from the first unit 10Y. The support roller 24 receives a force by a spring or the like (not shown) in the direction in which it departs from the driving roller 22, and thus a tension is given to the intermediate transfer belt 20 wound on both of the rollers. In addition, an intermediate transfer medium cleaning device 30 opposed to the driving roller 22 is provided in a surface of the intermediate transfer belt 20 on the image holding member side.

In addition, developing devices (developing sections) 4Y, 4M, 4C and 4K of the units 10Y, 10M, 10C and 10K are supplied with four color toners of yellow, magenta, cyan, and black accommodated in toner cartridges 8Y, 8M, 8C and 8K, respectively.

The above-mentioned first to fourth units 10Y, 10M, 10C, and 10K have the same configuration, and thus only the first unit 10Y that is used for forming a yellow image and is disposed on the upstream side in the traveling direction of the intermediate transfer belt will be representatively described. The same portions as in the first unit 10Y will be denoted by the reference numerals having magenta (M), cyan (C), and black (K) added instead of yellow (Y), and descriptions of the second to fourth units 10M, 10C, and 10K will be omitted.

The first unit 10y has a photoreceptor 1Y acting as an image holding member. Around the photoreceptor 1Y, a charging roller 2Y that charges the surface of the photoreceptor 1Y to a predetermined potential, an exposure device (electrostatic charge image forming section) 3 that exposes the charged surface with a laser beam 3Y based on a color-separated image signal to form an electrostatic charge image, a developing device (developing section) 4Y that supplies a charged toner to the electrostatic charge image to develop the electrostatic charge image, a primary transfer roller (primary transfer section) 5Y that transfers the developed toner image onto the intermediate transfer belt 20, and a photoreceptor cleaning device (cleaning section) 6Y that removes the toner remaining on the surface of the photoreceptor 1Y after primary transfer, are arranged in sequence.

The primary transfer roller 5Y is disposed inside the intermediate transfer belt 20 and is provided at a position opposed to the photoreceptor 1Y. Bias supplies (not shown) that apply a primary transfer bias are connected to the primary transfer rollers 5Y, 5M, 5C, and 5K, respectively. The bias supplies change the transfer bias that is applied to the respective primary transfer rollers under the control of a controller (not shown).

Hereinafter, the operation of forming a yellow image in the first unit 10Y will be described. First, before the operation, the surface of the photoreceptor 1Y is charged to a potential of from about −600 V to about −800 V by the charging roller 2Y.

The photoreceptor 1Y is formed by stacking a photosensitive layer on a conductive base (volume resistivity at 20° C.: $1 \times 10^{-6}$ Ωcm or less). Generally, the photosensitive layer has high resistance (nearly the same resistance as that of a general resin), but has a property that, when the laser beam 3Y is applied thereto, the specific resistance of a portion irradiated with the laser beam changes. Accordingly, the laser beam 3Y is output to the surface of the charged photoreceptor 1Y via the exposure device 3 in accordance with image data for yellow sent from the controller (not shown). The photosensitive layer on the surface of the photoreceptor 1Y is irradiated with the laser beam 3Y, whereby an electrostatic charge image of a yellow print pattern is formed on the surface of the photoreceptor 1Y.

The electrostatic charge image is an image that is formed on the surface of the photoreceptor 1Y by charging, and is a so-called negative latent image, that is formed by irradiating the photosensitive layer with the laser beam 3Y so that the specific resistance of the irradiated portion is lowered to cause charges to flow on the surface of the photoreceptor 1Y and cause charges to stay in a portion that is not irradiated with the laser beam 3Y.

The electrostatic charge image that is formed on the photoreceptor 1Y in this manner is rotated up to a predetermined developing position with the travelling of the photoreceptor 1Y. The electrostatic charge image on the photoreceptor 1Y is visualized (to form a developed image) at the developing position by the developing device 4Y.

The developing device 4Y contains the electrostatic charge image developer according to this exemplary embodiment accommodating, for example, at least a yellow toner and a carrier. The yellow toner is stirred in the developing device 4Y to be frictionally charged, and is held on a developer roll (developer holding member) with a charge having the same polarity (negative) as the charge on the photoreceptor 1Y. When the surface of the photoreceptor 1Y passes through the developing device 4Y, the yellow toner is electrostatically adhered to an erased latent image portion on the surface of the photoreceptor 1Y, and the latent image is developed with the yellow toner. The photoreceptor 1Y having the yellow toner image formed thereon travels continuously at a predetermined rate, and the toner image developed on the photoreceptor 1Y is transported to a predetermined primary transfer position.

When the yellow toner image on the photoreceptor 1Y is transported to the primary transfer position, a primary transfer bias is applied to the primary transfer roller 5Y, and an electrostatic force from the photoreceptor 1Y toward the primary transfer roller 5Y acts on the toner image, whereby the toner image on the photoreceptor 1Y is transferred onto the intermediate transfer belt 20. At this time, the applied transfer bias has a positive (+) polarity opposite to the polarity (−) of the toner. For example, the transfer bias of the first unit 10Y is controlled to about +10 μA by the controller (not shown).

Meanwhile, the toner that remains on the photoreceptor 1Y is removed by the cleaning device 6Y to be collected.

The primary transfer bias that is applied to the primary transfer rollers 5M, 5C, and 5K of the second and subsequent units 10M, 10C, and 10K is controlled in the same manner as in the first unit.

In this manner, the intermediate transfer belt 20 onto which the yellow toner image is transferred by the first unit 10Y is sequentially transported through the second to fourth units 10M, 10C, and 10K, and the toner images of respective colors are superposed and multiply-transferred.

The intermediate transfer belt 20 onto which the toner images of four colors are multiply-transferred through the first to fourth units reaches a secondary transfer portion that includes the intermediate transfer belt 20, the support roller coming into contact with the inner surface of the intermediate transfer belt, and a secondary transfer roller (secondary transfer section) 26 disposed on the image holding surface side of the intermediate transfer belt 20. A recording sheet (transfer medium) P is supplied to a gap between the secondary transfer roller 26 and the intermediate transfer belt 20, which are pressed against each other, via a supply mechanism at a predetermined timing, and a secondary transfer bias is applied to the support roller 24. At this time, the applied transfer bias has the same polarity (−) as the polarity (−) of the toner. An electrostatic force from the intermediate transfer belt 20 toward the recording sheet P acts on the toner image, and the toner image on the intermediate transfer belt 20 is transferred onto the recording sheet P. The secondary transfer bias is determined depending on the resistance detected by a resistance detecting machine (not shown) that detects the resistance of the secondary transfer portion, and is voltage-controlled.

Thereafter, the recording sheet P is fed to a pressure-contact portion (nip portion) of a pair of fixing rolls of the fixing device (roll-shaped fixing section) 28, and the toner image is fixed to the recording sheet P, whereby the fixed image is formed.

Examples of the transfer medium onto which the toner image is transferred include plain paper, OHP sheet and the like that are used in electrophotographic copiers, printers and the like.

In order to further improve the smoothness of the image surface after fixing, the surface of the transfer medium is desirably smooth. For example, coating paper in which the surface of plain paper is coated with a resin or the like, art paper for printing and the like are preferably used.

The recording sheet P on which color image fixing is completed is sent toward a discharge portion, and a series of the color image forming operations ends.

The image forming apparatus illustrated as above has a configuration in which the toner image is transferred onto the recording sheet P via the intermediate transfer belt 20, but is not limited to this configuration. The toner image may be directly transferred onto a recording sheet from the photoreceptor.

Process Cartridge and Toner Cartridge

Figure 2:
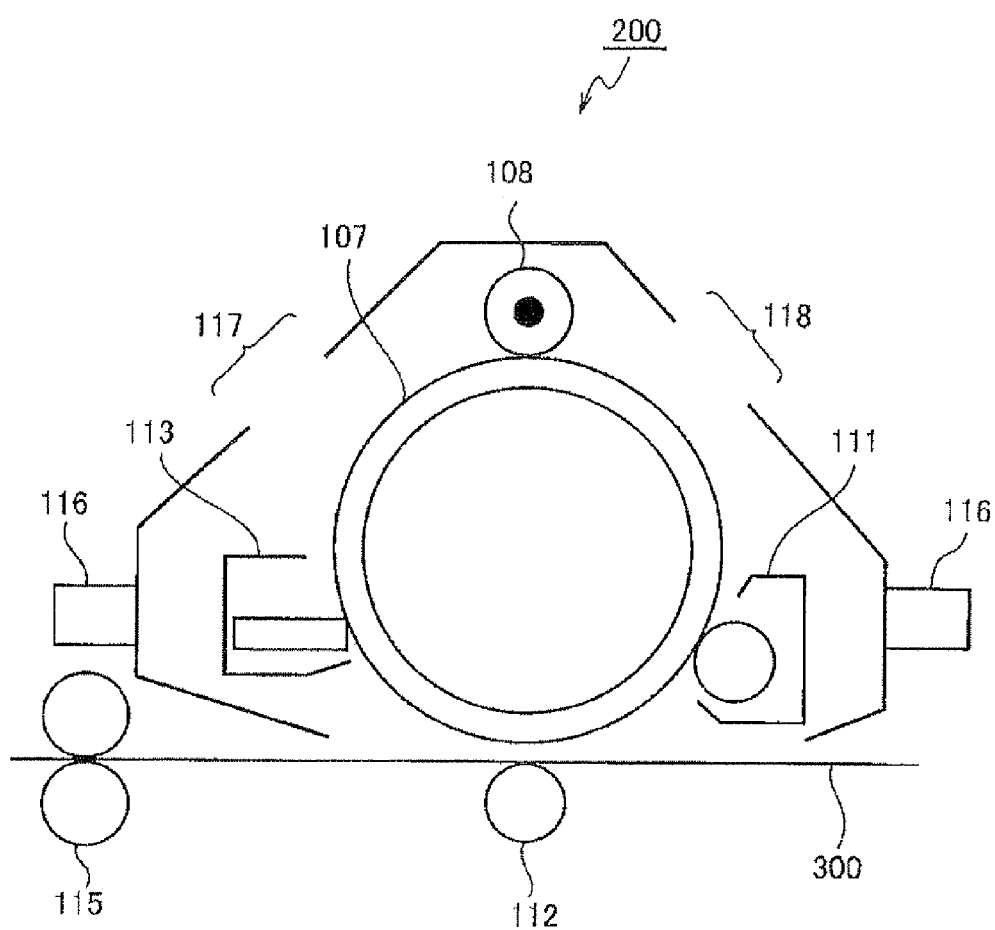
FIG. 2, is a diagram schematically showing the configuration of an example of a process cartridge according to the exemplary embodiment.

FIG. 2 is a diagram schematically showing the configuration of a preferable example of a process cartridge containing the electrostatic charge image developer according to this exemplary embodiment. A process cartridge 200 has, in addition to a photoreceptor 107, a charging roller 108, a developing device 111, a photoreceptor cleaning device 113, an opening portion 118 for exposure, and an opening portion 117 for erasing exposure, that are combined and integrated using an attachment rail 116. The reference number 300 in FIG. 2 represents a transfer medium.

The process cartridge 200 is detachably mounted on an image forming apparatus including a transfer device 112, a fixing device 115, and other constituent portions (not shown).

The process cartridge 200 shown in FIG. 2 is provided with the charging device 108, the developing device 111, the cleaning device 113, the opening portion 118 for exposure, and the opening portion 117 for erasing exposure, but these devices may be selectively combined. The process cartridge according to this exemplary embodiment is provided with at least one selected from the group consisting of the charging device 108, the developing device 111, the cleaning device (cleaning section) 113, the opening portion 118 for exposure, and the opening portion 117 for erasing exposure, as well as the photoreceptor 107.

Next, a toner cartridge according to this exemplary embodiment will be described. The toner cartridge according to this exemplary embodiment is detachable from an image forming apparatus, and accommodates at least an electrostatic charge image developing toner for replenishment to be supplied to a developing section provided in the image forming apparatus.

The image forming apparatus shown in FIG. 1 is an image forming apparatus that has a configuration in which the toner cartridges 8Y, 8M, 8C, and 8K are detachably mounted. The developing devices 4Y, 4M, 4C, and 4K are connected to the toner cartridges corresponding to the respective developing devices (colors) via toner supply tubes (not shown). In addition, when the toner contained in a toner cartridge runs low, the toner cartridge is replaced.

EXAMPLES

Hereinafter, this exemplary embodiment will be described in detail with reference to examples, but is not limited only to the following examples. "Parts" and "%" means "parts by weight" and "% by weight", respectively, unless particular notice is given.

Preparation of Monovalent Rosin

Monovalent Rosin A1

The following material is used as a monovalent rosin A1.

RONDIS (manufactured by Arakawa Chemical Industries, Ltd.)

Preparation of Divalent Rosin

Divalent Rosin B1

The above-mentioned monovalent rosin A1 (332 g) and an acrylic acid (manufactured by Wako Pure Chemical Industries, Ltd.) (72 g) are added and reacted for 8 hours at 200° C. to obtain a divalent rosin B1.

Then, distillation is performed at 200° C. under reduced pressure of 5.3 kPa to remove the unreacted acrylic acid. 5 g is removed.

The obtained divalent rosin B1 has a modification degree of 85%.

Example 1

Synthesis of Polyester Resin 1

1,4-butanediol, dimethyl terephthalate, a monovalent rosin, and zinc acetate dihydrate as a reaction catalyst are added in accordance with the following formulation, and charged into a stainless-steel reaction container provided with a stirrer, a heater, a thermometer, a fractionator, and a nitrogen gas introduction tube to be reacted for 4 hours at 170° C. while being stirred under a nitrogen atmosphere. Then, the resultant material is reacted for 7 hours at 200° C.

Blending Amount 1,4-Butanediol: 100 parts by weight

Monovalent Rosin A1: 15 parts by weight

Dimethyl Terephthalate: 85 parts by weight

Zinc Acetate Dihydrate: 1 part by weight

Preparation of Toner Particles 1

The following compositions are kneaded by an extruder and pulverized by a surface pulverization-type pulverizer. Thereafter, a wind classifier (TURBO-CLASSIFIER (TC-15N), manufactured by Nisshin Engineering Inc.) classifies the pulverized material into fine particles and coarse particles, and a step of obtaining middle-size particles is repeatedly performed three times. Thus, toner particles 1 having a volume average particle diameter of 6 μm are obtained.

Blending Amount

Polyester Resin 1: 83 parts by weight

Cyan. Pigment: Copper Phthalocyanine B 15:3 (Dainichiseika Color & Chemicals Mfg. Co., Ltd.): 10 parts by weight Paraffin Wax: HNP-9 (Nippon Seiro Co., Ltd.): 7 parts by weight Preparation of Electrostatic Charge Image Developer 1

Manufacturing of Toner 0.5 part by weight of silica (product name: R812 (manufactured by Nippon Aerosil Co., Ltd.)) is added to 100 parts by weight of toner particles 1 and mixed therewith by a high-speed mixer to obtain a toner 1.

Using the above-mentioned toner 1 and a carrier formed of ferrite that has a particle diameter of about 50 μm and is covered with a methyl methacrylate-styrene copolymer, 7 parts by weight of the toner 1 is added to 100 parts by weight of the carrier and mixed therewith by a tumbler shaker mixer to obtain an electrostatic charge image developer 1.

Evaluation

Evaluation of Coloring of Polyester Resin

The coloring of the polyester resin 1 is visually evaluated under the following conditions.

The polyester resin is dissolved at 200 degrees in an aluminum cup to form a disk, and then visually judged.

The evaluation standard is as follows.

The evaluation results are shown in Table 2.

1: No coloring.
2: There is transparency with yellow coloring.
3: There is no transparency with yellow coloring.
4: There is no transparency with brown coloring.

Evaluation of Electrostatic Property of Toner

Regarding the electrostatic property of the toner, the developer on the magnetic roller sleeve in a developing machine is collected and subjected to the measurement using TB 200 manufactured by Toshiba Corporation under conditions of a room temperature of 25° C. and a humidity of 50%.

The evaluation results are shown in Table 2.

Evaluation of Low-Temperature Fixability of Toner

The low-temperature fixability of the prepared toners is checked as follows.

A solid image having a size of 40 mm×50 mm is formed as an image, the toner amount is set to 1.5 mg/cm$^2$, and mirror-coated platinum paper (basic weight: 127 gsm) is used as a recording sheet for evaluation. Next, DOCUPRINT C2220 is modified so that the fixing temperature of a fixing machine is made variable, and fixability is evaluated with an increase in the fixing temperature from 100° C. in a stepwise manner.

As for the low-temperature fixability, a good fixed image having no image defect due to a release error is folded using a weight having a predetermined load, and the image defect of the folded portion is expressed in grades. The fixing temperature at which a certain grade or higher is reached is set as a minimum fixing temperature and used as a low-temperature fixability index.

The evaluation standard is as follows.
A: 140° C. or lower
B: Higher than 140° C. and equal to or lower than 160° C.
C: 160° C. or higher
The evaluation results are shown in Table 2.

Examples 2 and 3 and Comparative Examples 1 to 3

Synthesis of Polyester Resins 2 to 6

A zinc compound (reaction catalyst), a mono- or divalent rosin, a divalent alcohol, and divalent carboxylic acid are added according to the composition in Table 1 and reacted in the same manner as in the case of the polyester resin 1 to obtain polyester resins 2 to 6.

The polyester resins 2 to 6 are evaluated in the same manner as in the case of the polyester resin 1.

The evaluation results are shown in Table 2.

Preparation of Toner Particles 2 to 6

Toner particles 2 to 6 are prepared in the same manner as in the case of the toner particle 1, except that the polyester resin 1 is changed to the polyester resins 2 to 6.

Preparation of Electrostatic Charge Image Developers 2 to 6

Electrostatic charge image developers are prepared and evaluated in the same manner as in the case of the electrostatic charge image developer 1, except that the toner particles 1 are changed to the toner particles 2 to 6.

The evaluation results are shown in Table 2.

TABLE 1

|  |  | Example 1 Polyester Resin 1 | Example 2 Polyester Resin 2 | Example 3 Polyester Resin 3 | Comparative Example 1 Polyester Resin 4 | Comparative Example 2 Polyester Resin 5 | Comparative Example 3 Polyester Resin 6 |
|---|---|---|---|---|---|---|---|
| Reaction Catalyst | Zinc Acetate Dihydrate | 1 Part by weight | 1 Part by weight | 1 Part by weight | — | — | — |
|  | Dibutyltin Oxide | — | — | — | 1 Part by Weight | 1 Part by Weight | — |
|  | Titanium Tetra-butoxide | — | — | — | — | — | 1 Part by Weight |
| Rosin | Monovalent Rosin (type/parts by weight) | A1/15 Parts by weight | — | — | — | A1/15 Parts by Weight | A1/15 Parts by weight |
|  | Divalent Rosin (type/parts by weight) | — | B1/30 Parts by weight | B1/30 Parts by Weight | B1/30 Parts by Weight | — | — |
| Divalent Carboxylic Acid | Dimethyl Terephthalate | 85 Parts by Weight | 70 Parts by Weight | 10 Parts by Weight | 70 Parts by Weight | 85 Parts by Weight | 85 Parts by Weight |
|  | Sebacic Acid | — | — | 60 Parts by Weight | — | — | — |
| Divalent Alcohol | 1,4-Butanediol | 100 Parts by Weight | 100 Parts by Weight | — | 100 Parts by weight | 100 Parts by weight | 100 Parts by Weight |
|  | Bisphenol A-Propylene Oxide | — | — | 100 Parts by weight | — | — | — |
| Weight Average Molecular Weight (Mw) |  | 20000 | 23000 | 21000 | 15000 | 13000 | 10000 |
| Acid Value (mg KOH/g) |  | 12 | 13 | 12 | 12 | 12 | 14 |
| Glass Transition Temperature (° C.) |  | 60 | 65 | 59 | 60 | 57 | 56 |
| Softening Temperature (° C.) |  | 120 | 125 | 118 | 118 | 114 | 113 |

TABLE 2

|  | Polyester Resin | Evaluation of Polyester Resin Coloring | Evaluation of Toner | |
| --- | --- | --- | --- | --- |
|  |  |  | Electrostatic Property (μC/g) | Low-Temperature Fixability |
| Example 1 | Polyester Resin 1 | 2 | 75 | B |
| Example 2 | Polyester Resin 2 | 2 | 80 | A |
| Example 3 | Polyester Resin 3 | 2 | 105 | A |
| Comparative Example 1 | Polyester Resin 4 | 4 | 55 | C |
| Comparative Example 2 | Polyester Resin 5 | 3 | 60 | C |
| Comparative Example 3 | Polyester Resin 6 | 5 | 52 | C |

From the above results, the polyester resins according to this exemplary embodiment are suppressed in terms of coloring in comparison to the comparative examples.

In addition, it is found that the electrostatic property and the low-temperature fixability of the toners according to this exemplary embodiment are improved in comparison to the comparative examples.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A polyester resin that is a polycondensate obtained by reacting a divalent alcohol, a divalent carboxylic acid, and a mono- or divalent rosin with a zinc compound as a reaction catalyst, the zinc compound having a salt structure resulting from a reaction between an acid and zinc, wherein:

the divalent alcohol is selected from the group consisting of ethylene glycol, 1,2-propanediol, 1,3-propanediol, 1,2-butanediol, 1,3-butanediol, 1-4-butanediol, 2,3-butanediol, 1-4-butenediol, 2-methyl-1,3-propanediol, 1,5-pentanediol, neopentyl glycol, 2-ethyl-2-methylpropane-1,3-diol, 2-butyl-2-ethylpropane-1,3-diol, 1,6-hexanediol, 3-methyl-1,5-pentanediol, 2-ethyl-1,3-hexanediol, 2,4-dimethyl-1,5-pentanediol, 2,2,4-trimethyl-1,3-pentanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, 1,14-eicosanedecanediol, 3-hydroxy-2,2-dimethylpropyl-3-hydroxy-2,2-dimethylpropanoate, diethylene glycol, triethylene glycol, polyethylene glycol, dipropylene glycol, polypropylene glycol, a bisphenol A-ethylene oxide adduct, a bisphenol A-propylene oxide adduct, and a bisphenol A-butylene oxide adduct;

the divalent carboxylic acid is selected from the group consisting of phthalic acid, isophthalic acid, terephthalic acid, 1,4-naphthalenedicarboxylic acid, 2,6-naphthalenedicarboxylic acid, oxalic acid, malonic acid, maleic acid, fumaric acid, citraconic acid, itaconic acid, glutaconic acid, succinic acid, adipic acid, sebacic acid, azelaic acid, an alkylsuccinic acid having an alkyl group with a carbon number of from 1 to 20 and having a branched chain, an alkenylsuccinic acid having an alkenyl group with a carbon number of from 1 to 20 and having a branched chain, anhydrides of the acids, and alkyl esters having a carbon number of from 1 to 3 of the acids;

an amount of the zinc compound reaction catalyst is from 0.5 parts by weight to 1.5 parts by weight with respect to 100 parts by weight of a total amount of the divalent alcohol, the divalent carboxylic acid, and the mono- or divalent rosin;

when the monovalent rosin is reacted to form the polyester resin, the monovalent rosin is contained in the polyester resin in an amount of from 5% by weight to 20% by weight with respect to an entire carboxylic acid component; and when the divalent rosin is reacted to form the polyester resin, the divalent rosin is contained in the polyester resin in an amount of from 5% by weight to 70% by weight with respect to the entire carboxylic acid component.

2. The polyester resin according to claim 1, wherein a weight average molecular weight of the polyester resin is from about 15,000 to about 30,000.

3. An electrostatic charge image developing toner comprising:
the polyester resin according to claim 1.

4. An electrostatic charge image developer comprising:
the electrostatic charge image developing toner according to claim 3.

5. An image forming method comprising:
charging the surface of an image holding member;
forming an electrostatic charge image on the surface of the image holding member;
developing the electrostatic charge image with the electrostatic charge image developer according to claim 4 to form a toner image;
transferring the toner image onto a recording medium; and
fixing the toner image to the recording medium.

6. The polyester resin according to claim 1, wherein the rosin is a (meth)acrylic acid-modified rosin.

7. The polyester resin according to claim 1, wherein the zinc compound is selected from the group consisting of zinc acetate and zinc acetate dihydrate.

8. The polyester resin according to claim 1, wherein the zinc compound is zinc acetate dihydrate.

9. The polyester resin according to claim 1, wherein the amount of the zinc compound reaction catalyst is 0.5 part by weight with respect to 100 parts by weight of a total amount of the divalent alcohol, the divalent carboxylic acid, and the mono- or divalent rosin.

10. The electrostatic charge image developing toner according to claim 3, wherein the polyester resin comprises zinc in an amount of from 0.08% by weight to 1.5% by weight with respect to the toner.

11. An electrostatic charge image developing toner comprising:
- a binder resin containing a polyester resin that is a polycondensate obtained by reacting zinc acetate or zinc acetate dihydrate with a divalent alcohol, a divalent carboxylic acid, and either (i) a monovalent rosin, an amount of the monovalent rosin being from 5% by weight to 20% by weight with respect to an entire carboxylic acid component, or (ii) a divalent rosin, an amount of the divalent rosin being from 5% by weight to 70% by weight with respect to the entire carboxylic acid component,
- wherein an amount of the zinc acetate or zinc acetate dihydrate is from 0.5 parts by weight to 1.5 parts by weight with respect to 100 parts by weight of a total amount of the divalent alcohol, the divalent carboxylic acid, and the mono- or divalent rosin.

* * * * *